UNITED STATES PATENT OFFICE.

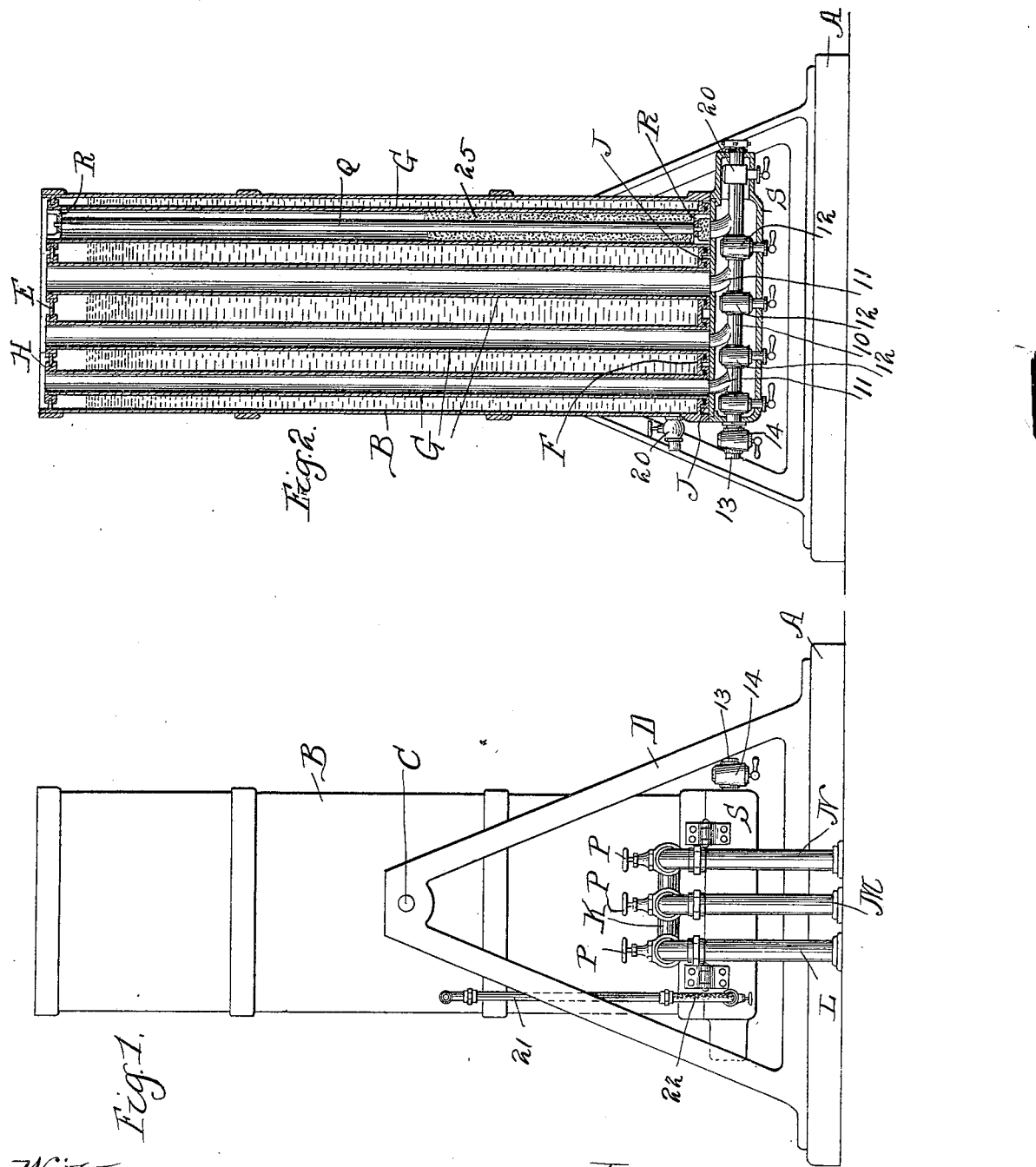

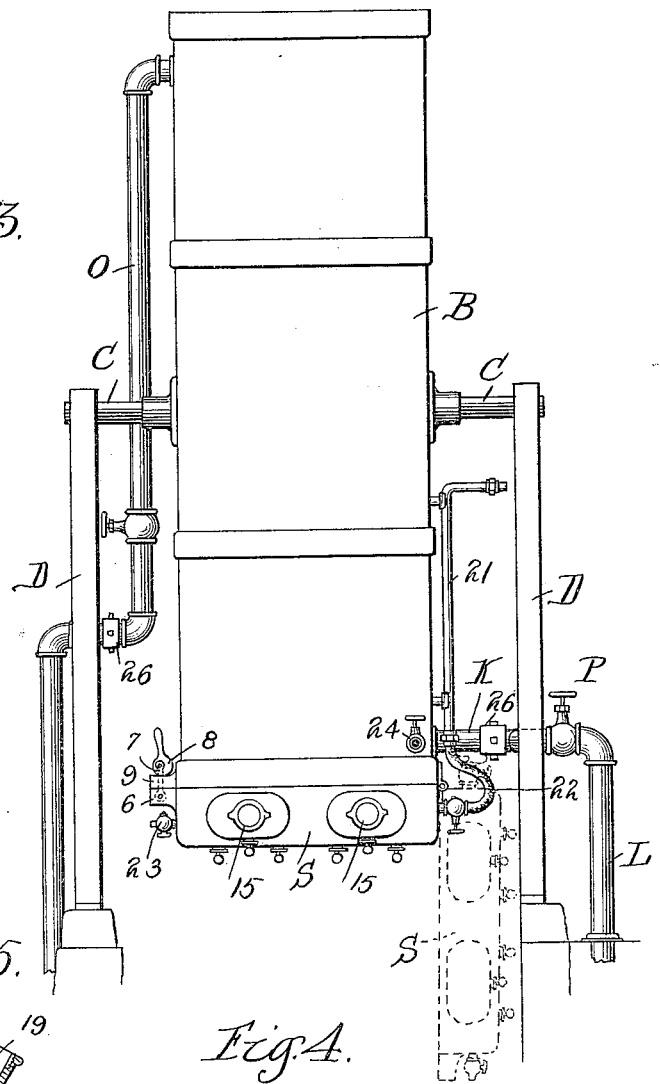
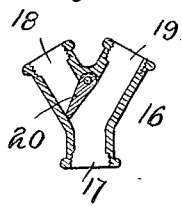
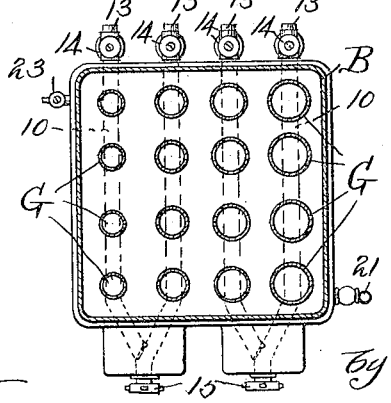

LLEWELLYN GROFF, OF CHICAGO, ILLINOIS.

MACHINE FOR MAKING PRINTERS' ROLLERS.

SPECIFICATION forming part of Letters Patent No. 623,538, dated April 25, 1899.

Application filed February 14, 1898. Serial No. 670,163. (No model.)

*To all whom it may concern:*

Be it known that I, LLEWELLYN GROFF, a citizen of the United States, residing at Chicago, in the county of Cook and State of Illinois, have invented a new and useful Machine for Making Printers' Rollers, of which the following is a specification.

This invention relates to machines for making printers' rollers.

The object of the invention is to provide an apparatus which is simple in construction and arrangement and efficient in operation for manufacturing printers' composition rollers.

The invention consists, substantially, in the construction, combination, location, and relative arrangement of parts, all as will be more fully hereinafter set forth, as shown in the accompanying drawings, and finally specifically pointed out in the appended claims.

Referring to the accompanying drawings and to the various views and reference-signs appearing thereon, Figure 1 is a view in side elevation of an apparatus embodying the principles of the invention. Fig. 2 is a view in longitudinal central section of the same. Fig. 3 is a front elevation of the same, the door being shown in its open position in dotted lines. Fig. 4 is a horizontal sectional view of the chamber. Fig. 5 is a detail view in section, showing the divided supply-pipe for the composition and the valve therein.

The same part is designated by the same reference-sign wherever it occurs throughout the several views.

Reference-sign A designates a suitable base for supporting the apparatus.

B is the chamber or jacket in which the rolls are formed. This chamber or jacket may be of any suitable contour in cross-section—as, for instance, rectangular, as shown in Fig. 4, although it is evident that said chamber may be circular or of any other suitable contour and of any convenient, suitable, or desirable size, and carries trunnions C, arranged to be journaled in side brackets D, whereby said chamber or jacket may be swung or revolved endwise when occasion requires. Chamber or jacket B is closed at the ends thereof in any suitable manner—as, for instance, by means of the heads E F—so as to form a water or steam tight chamber or casing. Suitably mounted in chamber or casing B are a series of tubes G, arranged longitudinally with respect to said chamber or casing and suitably supported at the ends thereof in the heads E F of said chamber. These tubes G may be arranged in any suitable, convenient, or desirable manner. For instance and in the particular form shown, to which, however, the invention is not limited, these tubes are arranged in parallel rows (see Fig. 4) and are spaced a distance apart and also a distance from the interior surface or wall of casing or chamber B to permit the free circulation therearound of steam or water, as will be more fully hereinafter explained. The ends of tubes G may be secured in heads E F in any suitable or convenient manner. In the particular form shown, to which, however, the invention is not limited, the upper head E is arranged to receive threaded sleeves H, (see Fig. 2,) into which the upper ends of the tubes are screwed. At their lower ends the tubes G are provided with flanges J, adapted to be suitably secured upon the outer surface of the lower chamber-head F, the joints being suitably packed to render the same steam and water proof. If desired and in order to accommodate the apparatus to the simultaneous manufacture of rolls of different sizes, each row of tubes G may contain variously-sized rollers, as clearly indicated in cross-sectional view in Fig. 4. The invention, however, is not limited in this respect, as all the rollers, if desired, may be of the same size.

Arranged to communicate with chamber or casing B, adjacent to its lower end, is a pipe connection K, with which pipe connection communicate three pipes L M N, (see Fig. 1,) each being provided with a suitable valve P for controlling the same. One of said pipes is designed to supply hot water, air, or steam to the interior of casing or chamber B and in the space surrounding the tubes G. Another of said pipes is designed to supply cold water or air, and the third of said pipes is designed as an exhaust in order to exhaust or drain the water or other material contained in the chamber or casing B. Thus it will be seen that by suitably manipulating valves P hot water, hot air, or steam may be admitted to said chamber, or cold water, cold air, or other cooling medium may be supplied to said chamber, or said chamber may be drained, as conditions of use may demand. An overflow-pipe O is connected to chamber B, at the upper end thereof, as shown in Fig. 3, said pipe communicating with the interior of said chamber. By this construction it will be seen that any desired temperature may be maintained within chamber B and around the tubes G.

The tubes G are designed to receive the composition from which the rollers are made, and thus serve as molds in which the rolls are formed. It is usual to form printers' rolls upon cores. Therefore I arrange longitudinally and centrally within each tube which is to form a mold for a roll a suitable core Q. This may comprise a rod having a forked cap R mounted on each end thereof and operating to support the core within the tube G, centrally with respect thereto, and at the same time to permit the entrance of the composition to the tube, as clearly shown in Fig. 2.

The composition from which the rolls are made may be delivered into the mold-tubes G in many different ways. While, therefore, I have shown and will now describe an exceedingly simple and efficient construction for delivering the composition into the tubes, I desire it to be understood that the invention is not limited thereto, as many changes therein and variations therefrom may readily suggest themselves to persons skilled in the art and still fall within the spirit and scope of my invention. In the particular form shown I provide the lower end of chamber or casing B with a door S, which may be suitably hinged or pivoted at one edge thereof to the chamber or casing B and at its opposite edge carrying a lip or projection 6, to which is pivoted a link 7, the free end of said link being pivoted to a cam-lever 8. The chamber or casing B on its lower end is provided with a suitable coöperating projection or lip 9, suitably slotted to receive link 7, whereby by turning cam-lever 8 the door S may be tightly closed upon the bottom end of the chamber or casing B. The door S preferably comprises a steam or water tight chamber, as clearly shown in Fig. 2, and mounted therein are suitable delivery-pipes adapted to be connected to any suitable source of supply of the composition and through which the composition is delivered from such source and into the open ends of the mold-tubes G. In the particular form shown, to which, however, the invention is not limited and wherein I show four rows of mold-tubes G, I arrange within the inclosed chamber of door S four supply-pipes 10, each arranged within the plane containing the tubes of each row and each having a communication through the shell or casing of the door with the open end of each of the mold-tubes in that row, such connection being indicated at 11, Fig. 2. It is evident, however, that each mold-tube may have separate connection to the source of supply of the composition, if desired, without departing from the spirit and scope of my invention; but for the sake of convenience and economy and rapidity of manufacture I prefer to employ the same supply-pipe, or at least that portion thereof which is inclosed in the chamber of the door S, to supply several of the mold-tubes. However, in order that only one or more of the mold-tubes may be supplied from the same supply connection 10, although such supply connection may communicate with other and additional mold-tubes, said supply connection is provided with suitable cut-offs 12, between adjacent connections 11, whereby by suitably manipulating the cut-offs 12 when composition is forced into supply connection 10 it may be admitted to one or more or all of the tubes with which said connection 10 communicates, as may be desired. Similarly I provide each supply connection 10 with an extension 13 through the wall or casing of the door, and I provide in such extension a suitable cut-off or plug valve 14, whereby said pipe connections 10 may be suitably cleaned out when desired. While it is obvious that each pipe connection 10 may lead separately and independently to the supply source, in practice I prefer to employ only one source connection 15 for two or more of the supply connections 10, as clearly indicated in Figs. 4 and 5. In this construction the connection 15 comprises a three or more way joint 16, as indicated in Fig. 5, one way 17 thereof communicating with a supply-pipe, another way 18 thereof communicating with one of the supply connections 10, and another way 19 thereof communicating with the next adjacent or some other supply connection 10. A suitable valve 20 is arranged in joint 16, whereby when suitably manipulated composition may be admitted to any one of the pipe connections 10 which is connected to and communicates with joint 16.

The composition, as is well known, is introduced to the mold-cores in plastic condition. It is important, therefore, to maintain such material in plastic condition while being supplied to the tubes. In order, therefore, that such composition may not be unduly cooled while passing through the pipe connections 10, I form the door with a hollow chamber, as above stated, and which is steam and water tight, thereby forming a jacket surrounding the supply connections 10. Steam, hot water, or hot air may be supplied to this jacket in any suitable or convenient manner—for instance, through a pipe connection 21, having a flexible portion 22, to permit the door to be opened, and through which steam, hot water, or hot air may be supplied to the chamber of the door and in the space surrounding the supply connections 10. A vent or exhaust for the chamber of the door may be provided, as indicated at 23, by which the water of condensation may be drained therefrom, or by means of which, if desired, a circulation may be maintained by suitably connecting such vent or drain to the overflow-pipe O, for instance.

If desired and for convenience, the circulation or heating of the jacket of door S may be secured by a suitable connection from the lower end of chamber or casing B—as, for instance, through a suitable connection 24—from which a suitable pipe may lead to the door.

In Fig. 2 I have shown only one of the tubes supplied with a core Q, and this tube is shown partially filled with the roller composition, as at 25.

When the desired number of mold-tubes G are filled with the roller composition and the operation is completed, the supply of material is cut off, the chamber or casing B is drained or exhausted of steam or hot water, and then filled or supplied with cold water, cold air, or other chilling medium, thereby causing the composition rollers to become hardened and set. The doors is then opened and the rollers are withdrawn endwise from the mold-tubes and are ready for the market.

By pivotally mounting chamber or casing B upon trunnions C the chamber or casing may be inverted end for end for the purpose of cleaning out the mold-tubes or for withdrawing the rollers from either end of such chamber or casing. Of course when this chamber is rocked or swung about its trunnions it is necessary to disconnect pipes L, M, and N therefrom and also overflow-pipe O, and to this end a detachable coupling is shown in pipe connection K and also in overflow-pipe O, as at 26. The supply-pipe 21 for the door may be provided with a flexible connection at any suitable point in its length to permit such swinging movement of the chamber or casing B.

Having now set forth the object and nature of my invention and a form of apparatus embodying the same, I desire it to be understood that the invention is not limited or restricted to the exact details of construction and arrangement shown and described, for many variations therefrom and changes therein may readily suggest themselves to persons skilled in the art and still fall within the spirit and scope of the invention; but

What I claim as new and useful and of my own invention, and desire to secure by Letters Patent of the United States, is—

1. In a machine for making printers' rolls, a chamber or casing closed at each end and having mold-tubes mounted longitudinally therein, a door for one end of said chamber or casing and comprising a hollow chamber, means for supplying the composition to said mold-tubes through said door, and means for maintaining said supply connections heated in said door, as and for the purpose set forth.

2. In a machine for making printers' rolls, a chamber or casing, mold-tubes mounted therein, a hinged or pivoted door for one end of said chamber or casing, a supply-pipe connection mounted in said door for delivering the roller composition to said tubes, said door being formed hollow, thereby forming an inclosed jacket for said supply-pipe connections, and means for delivering a heating medium to said jacket, as and for the purpose set forth.

3. In a machine for making printers' rolls, a chamber or casing having mold-tubes mounted therein, a hinged or pivoted door for one end of said chamber or casing, said door being provided with a hollow chamber, a supply-pipe connection mounted in the chamber of said door and communicating with a plurality of said tubes for delivering the roller composition to said tubes, the chamber of said door forming a jacket for said supply-pipe connection, and means for delivering steam or hot water to said jacket and around said supply-pipe connection, whereby the roller composition while being supplied to the tubes is maintained in heated and plastic condition, as and for the purpose set forth.

4. In a machine for making printers' rolls, a chamber or casing having a plurality of mold-tubes arranged therein, a door hinged or pivoted to one end of said casing, said door being formed hollow, a supply connection mounted in the chamber in said door and communicating with a plurality of said tubes for delivering the roller composition to said tubes, cut-off valves arranged in said supply-pipe connection whereby the composition may be supplied to one or more or all of the tubes communicating with said supply-pipe connection, and means for delivering into the chamber of the door a heating medium whereby the composition is maintained in a heated and plastic condition while being supplied to said tubes, as and for the purpose set forth.

5. In a machine for making printers' rolls, a chamber or casing, mold-tubes mounted therein, a hinged or pivoted door for one end of said chamber or casing, said door being formed hollow, a supply-pipe connection mounted in the chamber in said door and projecting at each end through the wall or casing of said door, said supply-pipe connection communicating with a source of supply for the roller composition at one projecting end thereof, and also communicating with the mold-tubes in said chamber or casing, and a blow-off or cleaning-out valve mounted in the other projecting end of said supply-pipe connection, as and for the purpose set forth.

6. In a machine for making printers' rolls, a chamber or casing, mold-tubes mounted therein, a door pivoted or hinged to one end of said chamber or casing, said door being formed hollow, supply-pipe connections mounted in the chamber of said door and communicating with the mold-tubes, adjacent supply-pipe connections being connected to channels of a three-way joint, said joint also communicating with a source of composition supply, a valve mounted in said three-way joint and arranged to control the communication between said supply-way and said supply-pipe-connection ways, and means for supplying the chamber of said door with a heating medium, as and for the purpose set forth.

In witness whereof I have hereunto set my hand, this 4th day of February, 1898, in the presence of the subscribing witnesses.

LLEWELLYN GROFF.

Witnesses:
S. E. DARBY,
CHARLES H. SEEM.